(12) United States Patent
Spitzer (10) Patent No.: US 7,201,479 B2
(45) Date of Patent: *Apr. 10, 2007

(54) PROTECTIVE SLEEVE FOR EYEGLASSES

(75) Inventor: Lynn Spitzer, San Francisco, CA (US)

(73) Assignee: Farsight Innovations, LLC, Las Vegas NV ( * ) Notice: Subject to any disclaimer, the term of this patent is extended or adjusted under 35 U.S.C. 154(b) by 0 days.

This patent is subject to a terminal disclaimer.

(21) Appl. No.: 11/150,078

(22) Filed: Jun. 10, 2005

(65) Prior Publication Data

US 2005/0231681 A1 Oct. 20, 2005

Related U.S. Application Data

(63) Continuation-in-part of application No. 10/990,980, filed on Nov. 17, 2004, now Pat. No. 7,021,759, which is a continuation-in-part of application No. 10/773,637, filed on Feb. 6, 2004, now Pat. No. 6,820,739.

(51) Int. Cl.
*G02C 1/00* (2006.01)

(52) U.S. Cl. ............................ 351/158; 351/111; 206/5

(58) Field of Classification Search .................. 351/41, 351/111, 122, 123, 156–158; 2/452, 454; 206/5

See application file for complete search history.

(56) References Cited

U.S. PATENT DOCUMENTS

| | | | | |
|---|---|---|---|---|
| 4,133,604 A | * | 1/1979 | Fuller | 351/123 |
| 4,541,696 A | * | 9/1985 | Winger et al. | 351/123 |
| 6,820,739 B1 | * | 11/2004 | Spitzer | 206/5 |
| 7,021,759 B2 | * | 4/2006 | Spitzer | 351/158 |

* cited by examiner

*Primary Examiner*—Huy K. Mai
(74) *Attorney, Agent, or Firm*—Grimes & Battersby, LLP (57) ABSTRACT

A protective cover for eyeglasses is provided comprising a pair of complementary tubular members that are fitted over the temples of a pair of glasses, each tubular member having sufficient material or elasticity to stretch to completely cover the lenses of the eyeglasses and a means to fit snugly around the temples. The pair of tubular members are formed as part of a single strap-like device which may be composed of a single tubular member or, alternatively, a strap having two ends, each of which are attached to the tubular member. Such embodiment allows a wearer to use the protective cover as a strap for holding the eyeglasses around his or her neck when not being worn.

12 Claims, 5 Drawing Sheets

PROTECTIVE SLEEVE FOR EYEGLASSES

RELATED APPLICATIONS

This is a continuation-in-part of U.S. patent application Ser. No. 10/990,980 filed on Nov. 17, 2004 now U.S. Pat. No. 7,021,759 in the name of Lynn Spitzer for "Protective Sleeve for Eyeglasses," which, in turn, was a continuation-in-part of U.S. patent application Ser. No. 10/773,637 filed on Feb. 6, 2004 in the name of Lynn Spitzer for "Protective Sleeve for Eyeglasses" and which has since matured into U.S. Letters Patent No. 6,820,739.

BACKGROUND OF THE INVENTION

1. Field of the Invention

The present invention relates generally to a protective cover for sunglasses and eyeglasses, and more particularly, to either a pair of elastic sleeves or a single sleeve designed to be fitted over the temples of a pair of sunglasses or eyeglasses when the glasses are being worn, then slid over and around the lenses of the glasses so as to provide protection to the lenses.

2. Description of the Prior Art

Protective covers and the like for sunglasses and eyeglasses are well known and have been universally used for many years, ranging from hard and soft cases to protective covers. These covers are designed to protect the lenses of the eyeglasses or sunglasses from damage, such as scratching, particularly when the glasses are taken off and stored. Most of these are carried separately from the eyeglasses and sunglasses.

Among such protective covers are sleeves or pouches that are utilized to cover the lenses of the glasses. An example of such a protective sleeve is disclosed in U.S. Pat. No. 4,953,695, which issued to Tallman on Sep. 4, 1990 for "Protective cover for eyeglasses." Tallman contemplates a protective cover for eyeglasses formed of a generally tubular member having axially opposite open ends constructed from relatively resilient material for housing at least the frame front and lenses of a pair of eyeglasses, which cover is hung on a retainer when not in use.

There are also numerous references in which the eyeglass cover is integrated with the retaining means. For example, U.S. Pat. No. 6,478,145, which issued to Mitchell on Nov. 12, 2002 for "Eyeglasses retainer and case with detachable straps" discloses a double rolled stretch fabric protective member which is detachably attached to a pair of connection members at each end to form an eyeglasses retainer and case combination with detachable straps. The connection members comprise tubular straps that may receive the stems of eyeglasses therein and are held in place on the stems by elastic bands within the ends of the straps. The assembly is then worn around the head or neck as a retainer preventing the eyeglasses from sliding forward or falling off in sports and such.

Similar devices are disclosed in U.S. Pat. No. 5,735,393, which issued to Shiue, et al. on Apr. 7, 1998 for "Eyeglass retainer/cover" which discloses an eyeglass retainer/cover being an integral combination eyeglass pouch and a neck strap fabricated from a single strip of flexible and stretchable fabric and U.S. Pat. No. 5,687,837, which issued to Seiler on Nov. 18, 1997 for "Eyeglass retainer and protective cover," which discloses a protective device for a pair of eyeglasses including a pouch into which the eyeglasses can be inserted, without removal of the attachment elements. The pouch in the Seiler patent is inverted between a retainer configuration wherein the eyeglasses are held to the head of a user and a cover configuration wherein the eyeglasses are lodged within the pouch. A positive closure permits the pouch to be closed in both the retainer and cover configurations and opened for insertion and removal of the eyeglasses. In a related patent, U.S. Pat. No. 5,593,024, which issued to Seiler on Jan. 14, 1997 for "Eyeglass retainer and protective cover," discloses a protective device for attachment to a pair of eyeglasses includes a pouch into which the eyeglasses can be inserted, without removal of the attachment elements. The pouch may be constructed with a drawstring closure, a snap closure, an elasticized closure or, in an alternate embodiment, separate pouches may be provided for separately protecting each of the eyeglass frames.

Other examples of the combination cover/retainer include U.S. Pat. No. 5,299,682, which issued to Tatar on Apr. 5, 1994 for "Eyeglass storage and protection device that can function to secure eyeglasses while eyeglasses are worn," in which the protection and storage enclosure is transformed into a strap and used to secure the eyeglasses around the head of the wearer; U.S. Pat. No. 5,151,778, which issued to Conley on Sep. 29, 1992 for "Eyeglass case and retainer," which discloses a case for holding eyeglasses integrated with the head band of an eyeglass retainer, in which a separate, flexible sheet conforms to the shape of and is secured to the head band case for defining a pocket between the base and the sheet, permitting the folded eyeglasses to be inserted through a slot and encased between the base and the sheet while attached to the retaining straps; and U.S. Pat. No. 5,102,216, which issued to Mitchell on Apr. 7, 1992 for "Eyeglasses retainer and case," which discloses the use of stretch fabric double rolled and then sewn to tubular straps at each end to form an eyeglasses retainer, case combination, which tubular straps are attached to the stems of eyeglasses and are held in place on the stems by elastic bands within the ends of the straps.

Another category of eyeglass protective cover can be described as an eyeglass cover that is folded and stored in a separate pouch with rings that can be attached to either the retainer or to one of the temples. An example of such cover is shown in U.S. Pat. No. 5,014,846, which issued to Walker, et al. on May 14, 1991 for "Protective cover for eyeglasses," which discloses a protective cover comprised of flexible material that can be folded into a compact configuration suitable for storage within a pouch, which is either integrally formed within a strap for retaining eyeglasses about one's neck or is provided with rings for attachment to the strap or portions of an eyeglass frame.

Still another type of eyeglass protective sleeve can be described as a cover made from a single flexible envelope of unitary construction open at both ends, designed to provide a lightweight, washable, inexpensive receptacle which can be easily folded upon itself to fit compactly within any pocket. An example of such a protective sleeve is shown in U.S. Pat. No. 4,863,013, which issued to Eastman on Sep. 5, 1989 for "Conformal protective spectacle receptacle," which discloses a spectacle receptacle comprising an envelope of woven material including a wall retention member and one or more end closures which can be refastened, which receptacle increases any primary dimension of the spectacles by no more than the thickness of the material.

It should be appreciated that much of the prior art relies on a retainer, which is needed to carry the cover when the user is not wearing the glasses. The addition of the retainer adds more components and encumbrance to the protective element, and is not aesthetically desirable to many users. Furthermore, the retainer may be dangerous in certain situations, such as when the glasses are being worn during athletic activities, since the retainer may get caught on outside objects while the user is in motion. In addition, the retainer is more likely to get lost, since it may be disconnected from the eyeglasses in certain situations, an event that is less likely to occur when the covers always reside on the eyeglass frames themselves.

Other prior art references require a separate pouch and rings to enable the cover to be attached to one of the temples, which is less efficient and more expensive to manufacture. These types of protective devices are typically disruptive to the user, since they result in an unequal weight distribution on the eyeglass frames that may pull the glasses to one side of the user's face, and the pouches dangle from the rings and may strike the side of the user's face during movement.

Many protective covers for eyeglasses use a single tubular sleeve which covers the entire pair of glasses, which protective elements cannot be carried on the eyeglass frame but must be stored separately, thereby being less convenient and more likely to be forgotten or lost.

As shall be appreciated, the prior art fails to specifically address either the problem or the solution arrived upon by applicant.

SUMMARY OF THE INVENTION

Against the foregoing background, it is a primary object of the present invention to provide a protective cover for sunglasses and eyeglasses.

It is another object of the present invention to provide such a protective cover comprising a pair of complementary tubular elastic members designed to be fitted around the temples of the eyeglasses when the eyeglasses are being worn, and slid over the lenses in order to protect the lenses when the eyeglasses are not being worn.

It is still another object of the present invention to provide such a protective cover comprising a single tubular elastic member designed to be fitted around the temples of the eyeglasses when the eyeglasses are being worn, and slid over the lenses in order to protect the lenses when the eyeglasses are not being worn.

It is but another object of the present invention to provide such a protective cover comprising a single strap-like device having a pair of tubular elastic members at either end designed to be fitted around the temples of the eyeglasses when the eyeglasses are being worn, and slid over the lenses in order to protect the lenses when the eyeglasses are not being worn.

It is yet another object of the present invention to provide such a protective cover that is inexpensive to produce and manufacture.

It is another object of the present invention to provide such a protective cover that is convenient and simple to use.

It is still another object of the present invention to provide such a protective cover that is non-intrusive and unobtrusive.

It is but another object of the present invention to provide such a protective cover that is aesthetically appealing and appropriate for use in a variety of circumstances.

It is yet another object of the present invention to provide such a protective cover that may be worn during athletic activities and not risk being caught on a foreign object.

It is but another object of the present invention to provide such a protective cover that may also be used as a lens cleaner.

It is yet another object of the present invention to provide such a protective cover that is lightweight.

It is still another object of the present invention to provide such a protective cover that does not need to cover the nose bridge of the glasses.

It is another object of the present invention to provide such a protective cover that may also be used to prevent light from disturbing the user in certain situations, such as lying on the beach or in tanning salons or sleeping in a lighted environment such as an airplane, by allowing the lens covers to be slid into the protective position, but still allow the eyeglasses to be worn.

It is but another object of the present invention to provide such a protective cover may help block sun rays from entering from the sides of the glasses.

It is yet another object of the present invention to provide such a protective cover that does not require a separate retainer or strap.

It is still another object of the present invention to provide one type of a protective cover that may be used on plastic framed glasses, and another type that is more particularly suited to wire-rimmed glasses or other glasses having small diameter frames.

It is another object of the present invention to provide such a protective cover that does not include multiple pieces that can become detached from one another and therefore will not be easily lost.

It is yet another object of the present invention to provide such a protective cover wherein the combination retainer/lens protector resides on the glasses whether or not they are being worn.

It is still another object of the present invention to provide such a protective cover that allows the glasses to be easily accessible when needed because the eyeglasses can be hung around the wearer's neck when the glasses are in protected mode.

To the accomplishments of the foregoing objects and advantages, the present invention, in brief summary, comprises a protective cover for eyeglasses having small diameter frames comprising a pair of complementary tubular members that are fitted over the temples of a pair of glasses, each tubular member having sufficient material or elasticity to stretch to completely cover the lenses of the eyeglasses and a means to fit snugly around the temples. A fixed retaining member is attached to one end of the tubular member and a one or more strips are attached about the opposite end of the tubular member, which end is intended to be stretched over the lenses. A sliding retaining member is also provided on the tubular member and is retained thereon by means of the fixed retaining member and the strips. In operation, the tubular member is retained on the temples by twisting the tubular member about the temple, using the fixed retaining member at one end and the combination of the strips and the sliding retaining member at the other end to frictionally engage the temple and prevent the tubular member from unravelling. In another embodiment, the pair of tubular members are formed as part of a single strap-like device which may be composed of a single tubular member or, alternatively, a strap having two ends, each of which are attached to the tubular member. Such embodiment allows a wearer to use the protective cover as a strap for holding the eyeglasses around his or her neck when not being worn.

BRIEF DESCRIPTION OF THE DRAWINGS

The foregoing and still other objects and advantages of the present invention will be more apparent from the detailed explanation of the preferred embodiments of the invention in connection with the accompanying drawings, wherein.

BRIEF DESCRIPTION OF THE PREFERRED EMBODIMENTS

Figure 1:
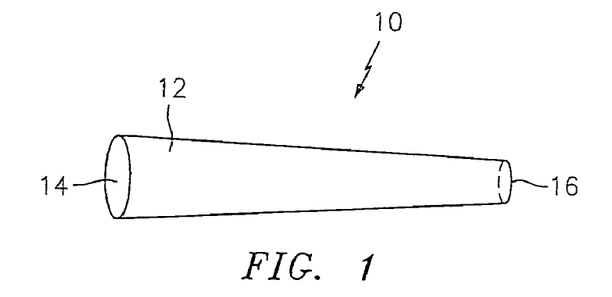
FIG. 1 is a perspective illustration of a single tubular member of the protective cover of the present invention.

Referring to the drawings and, in particular, to FIG. 1 thereof, the protective cover of the present invention is provided and is referred to generally by reference numeral 10. The protective cover 10 comprises a pair of complementary tubular members 12 which, in the preferred embodiment, are composed of a lightweight, elastic fabric made with fibers such as Lycra® or Spandex. These members 12 are each approximately 3 to 4 inches in length, and include a front opening 14 and a back opening 16 which allows each tubular member 12 to be slid over the temple 18 of a pair of glasses 20. Of course, depending upon the elasticity of the material used, the dimensions of the tubular members 12 may vary. For example, if a particularly elastic material is used, the length of the members 12 may be decreased, therefore minimizing the obtrusiveness of the protective cover 10. Alternatively, if a non-elastic material is used, the members 12 may have to be somewhat larger, a feature that might be desired, for example, if the protective cover 10 also serves to make a fashion statement.

The size of the tubular member 12 is such that it may be slid in place over the temple 18 of the eyeglasses 20 so as not to interfere with the user or create an unattractive or sloppy appearance. The tubular member 12 is slid in position by inserting the temple 18 through the front opening 14, along the length of the member 12 and out the back opening 16, such that the downwardly extending portion 19 of the temple 18 is free, allowing this member to rest above and forward of the ear of the user.

Figure 2:
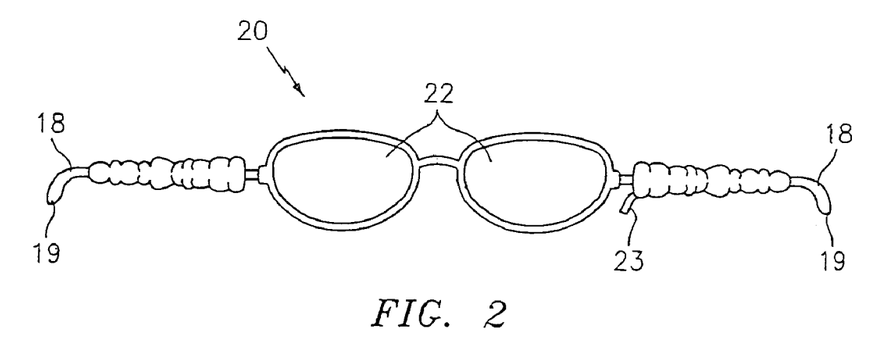
FIG. 2 is a front elevational view of the pair of tubular members comprising the protective cover of the present invention in the "off" position on a pair of glasses wherein the tubular members reside on the temples while the user wears the eyeglasses.

Depending upon the length of the tubular member 12 and the length and width of the temple 18, the tubular member 12 may become compacted or "scrunched" somewhat (as shown in FIG. 2) when in position over the temple 18. The elastic quality of the tubular member 12 allows the member 12 to conform to the shape of any temple 18, whether it be wide or long, curved or straight, or be of an unusual design.

Figure 3:
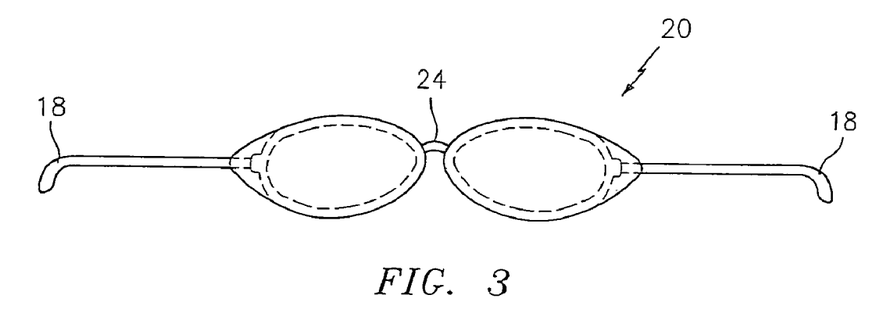
FIG. 3 is a front elevational view of the pair of tubular members comprising the protective cover of the present invention in the "protective" position on a pair of glasses wherein the tubular members reside on and protect the lenses from damage.

When the eyeglasses 20 are removed and protection of the lenses 22 is desired, the tubular members 12 are slid over the lenses 22 so as to completely cover them, as shown in FIG. 3. Here too, the elastic nature of the tubular members 12 allow the members 12 to conform precisely to the shape of the lenses 22, whether they be round, oblong, squared, thick, thin or of practically any shape or size. Separate tabs 23 may be provided at the end of the tubular members 12 in order to facilitate the sliding of the tubular members 12 on and off of the lenses 22. Said tabs 23 may be sewn onto the tubular members 12 or be an integral part thereof.

It should also be appreciated that there may be other reasons for requiring the placement a tubular member 12 over a lens 22 apart from protecting the lenses. For example, the member 12 may be utilized in place of an eye patch such as for eye conditions like Amblyopia, sometimes referred to as "lazy eye," for which the treatment may involve putting a patch over the eyeglass lens for the stronger eye.

The tubular members 12 are composed of a material that will protect the lenses 22 and not scratch or otherwise mar their surfaces. In the preferred embodiment, the tubular members 12 are dark in color, so as to be unobtrusive and aesthetically pleasing. However, it is anticipated that a variety of colors and designs may be implemented, such as tortoise shell, so as to match the design of the eyeglasses 20.

Furthermore, since in the preferred embodiment the protective cover 10 of the present invention may be worn with the tubular members 12 in place over the lenses 22, such as when the user desires to block out light while sunbathing or tanning or attempting to sleep in a lighted environment, the members 12 are not designed to cover the nose bridge 24 of the eyeglasses 20. Instead, the tubular members 12 are stretched just far enough to cover the lenses 22, resulting in the front openings 14 being immediately adjacent to either end of the nose bridge 24. It should be appreciated that in order to accomplish such feature, the tubular members 12 must be composed of a material that is either opaque or at least translucent.

Figure 4:
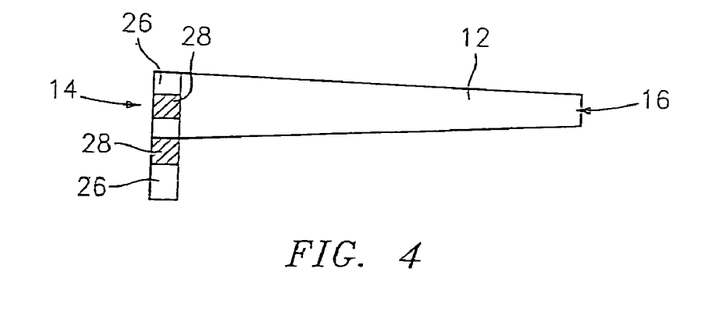
FIG. 4 is a front elevational view of an alternative embodiment of the tubular member of the present invention further including a hook and loop fastener in connection with an elastic tab for securing the member about the temple or the lens of the eyeglasses.

A number of alternative materials used in the construction of present invention are anticipated, many of which may not be elastic. For example, many fabrics are not stretchable, but still may be desired for a particular application of the protective cover 10. If such a fabric is desired, an additional feature must be added to the protective cover 10 so as to accomplish the goals of the present invention, e.g., to allow the tubular members 12 to fit firmly around the temples 18 and expand enough to cover the lenses 22. These features include, but are not limited to, shirred fabric, snaps, elastic bands, pull cords and clips. Another example, as illustrated in FIG. 4, is the use of hook and loop fasteners 26 in combination with elastic tabs or sections 28, which are used to constrict or expand the front opening 14 of the tubular members 12, depending upon whether the member is to fit over the temple 18 or the lens 22.

In the event that the material of the tubular members 12 cannot conform to the shape of the glasses 20, such as where the glasses 20 have very narrow temples 18 or particularly wide lenses 22, the ends of the members 12 may be made very elastic, or may include separate fasteners, such that the members 12 may hold the temples 18 more securely. The ends of the tubular members 12 may be twisted in opposite directions around the temples 18 a number of time so that material conforms to the shape of the temples 18 more closely when the tubular members 12 are not in the protective position. When protection of the lenses 22 is desired, the user need only twist the ends of the members 12 in the opposite direction. Of course, depending upon the fashion sense of the user, it may also be desired to allow the material of the tubular members 12 to hang loosely about the temples 18, in which event the twisting of the ends of the tubular members 12 is an unnecessary step. Of course, the ends of the tubular members 12 must be made elastic enough to engage the temples 18 so as to prevent sliding of the tubular members 12.

In an alternative embodiment, rather than being formed out of a tubular piece of material, the members 12 may be created from a single or multiple sheets of material which is formed so as to replicate the tubular member 12. For example, the sheet might be a quadrilateral piece of material in which one edge is wrapped around either the temple or the lens and then attached to the piece of material, either by fasteners such as snaps, buttons or Velcro® or by permanent means of attachment such as sewing or adhesive. Alternatively, the tubular member 12 can be created by sliding a flap of material through a slot on one end thereof, or tying the corners or tabs thereon, or by overlapping and joining opposite sides of the material.

Figures 5A, 5B, 5C:
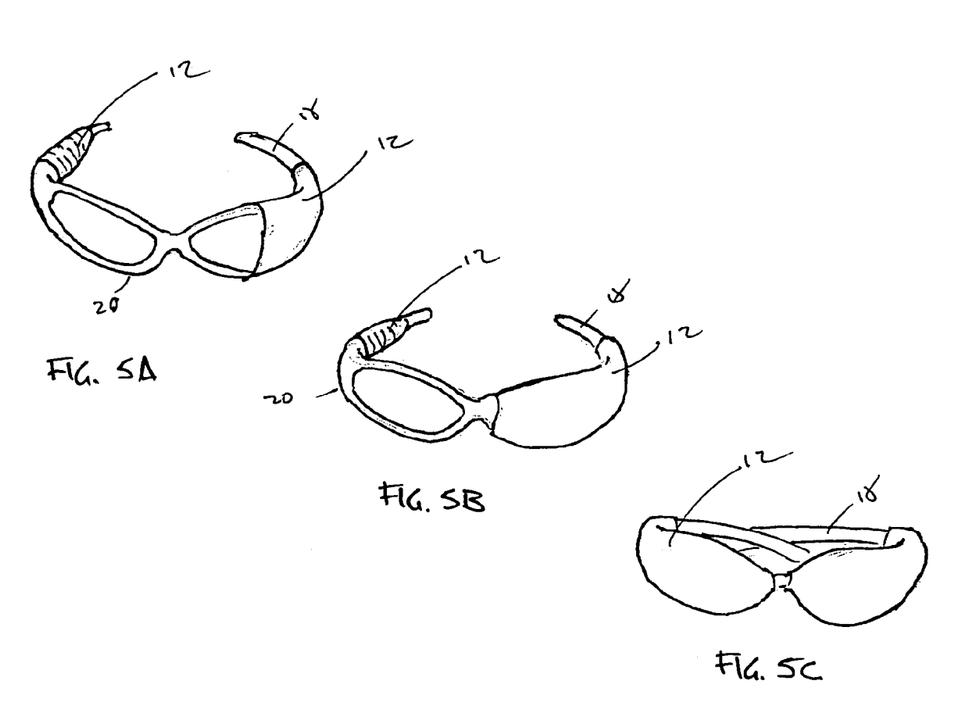
FIGS. 5A through 5C are perspective views of the protective member of the present invention showing its use in connection with plastic rimmed frames.

It should be appreciated that the tubular members 12 as described may be used with a variety of different styles of eyeglasses and sunglasses. For example, illustrated in FIG. 5 is the use of the protective cover 10 in connection with plastic framed glasses, wherein the tubular members are ideally 3 to 4 inches long and the stretchable fabric of the members 12 allows them to be slid over the temples 18 or the lenses 22.

Figure 6:
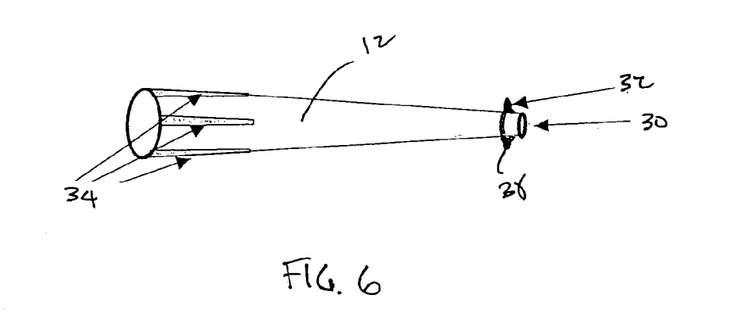
FIG. 6 is a perspective view of another alternative embodiment of the tubular member of the present invention including a fixed retaining member, a sliding retaining member, and silicon strips to prevent the sliding retaining member from sliding off the member.

For certain types of glasses, particularly wire-rimmed glasses and others having a small diameter frame, however, the elasticity of the fabric of the members 12 may not be sufficient to retain the members 12 on the temples 18. Illustrated in FIG. 6 is an alternative protective cover 10 that may be utilized for such glasses, such alternative cover 10 still including the elastic members 12, but further including a fixed retaining member 30 attached to about the back opening 16, and a sliding retaining member 32, as well a one or more strips 34 fixedly attached about the front opening 14.

Figure 7A:
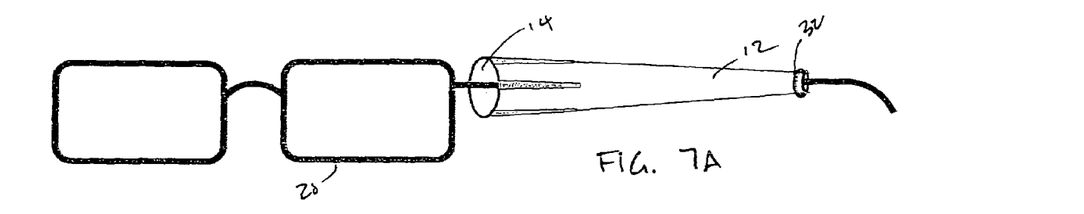
FIGS. 7A–7F are front elevational views illustrating the use of the tubular members of the embodiment of FIG. 6.
Figure 7B:
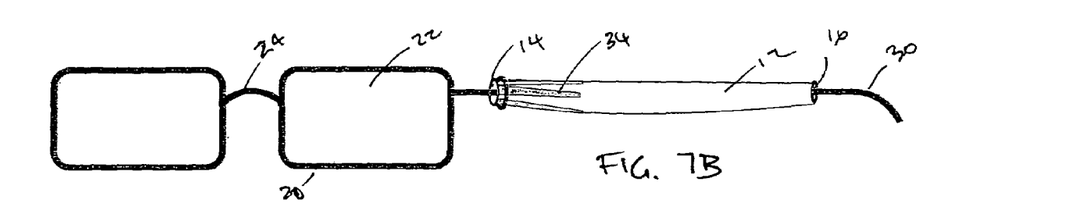
Figure 7C:
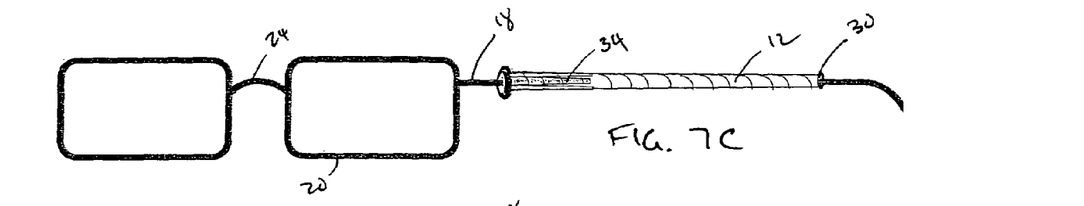

In actual operation, the user slides the tubular member 12 onto the temple 18. To wear the glasses 20, as illustrated in FIGS. 7A–7C, the user slides the sliding retaining member 32 over the strips 34 towards the front opening 14. The user then twists the ends of the tubular member 12 in opposite directions so that the tubular member rolls tightly against the temple 18. Towards this end, the fixed retaining member 30 attached about the back opening 16 should have a diameter small enough to fit snugly about the temple 18 near the earpiece 36 and to keep the back opening 16 of the tubular member 12 from unraveling or untwisting when the tubular member 12 is twisted tightly around the temple 18 (as illustrated in FIG. 7C). The sliding retaining member 32 may include a molded tab to allow the user to engage it with her fingertips and more easily move the sliding retaining member 32 back and forth across the tubular member 12.

In the preferred embodiment, the fixed and sliding retaining members 30, 32 comprise silicone, rubber or plastic rings, although other materials and shapes may also be used without sacrificing any of the functionality of these elements. Furthermore, the strips 34 in the preferred embodiment are composed of silicone, although other materials may also be utilized. The strips 34 are shown as being wider at one end and narrower at the other, which will allow the sliding retaining member 32 to gradually tighten the tubular member 12 around the temple 18 until there is enough tension to form a tight fit around the temple 18. This configuration also ensures that the front opening 14 of the tubular member 12 will not unravel when the tubular member 12 is twisted about the temple 18 while the glasses 20 are being worn, since the strips 34 are forced by compression against the twisted tubular member 12. Having the thicker ends of the strip 34 at the front opening 14 of the tubular member 12 will also help keep the sliding retaining member 32 from sliding off, although another barrier may be used, such as another fixed retaining member 30 mounted about the front opening 14. The strips 34 may be made longer than shown in FIGS. 7A–7F, which would have the added benefit of keeping some more elastic fabrics from falling into the hinge 40 between the temple 18 and the lens 22 when the glasses 20 are not being worn and the temples 18 are folded. Of course, the strips 34 may not be necessary at all if fixed retaining members 30 are used at either end of the tubular members 12, depending upon how the material of the members 12 gathers.

Figure 7D:
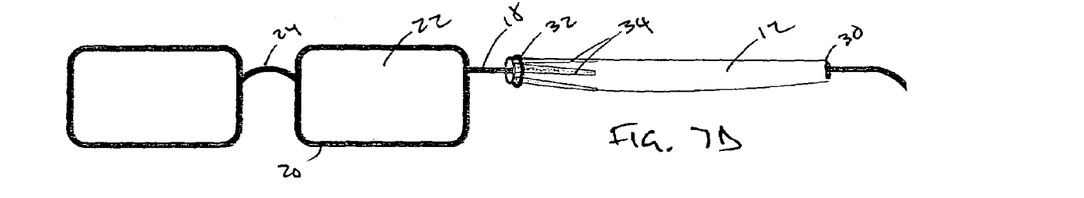
Figure 7E:
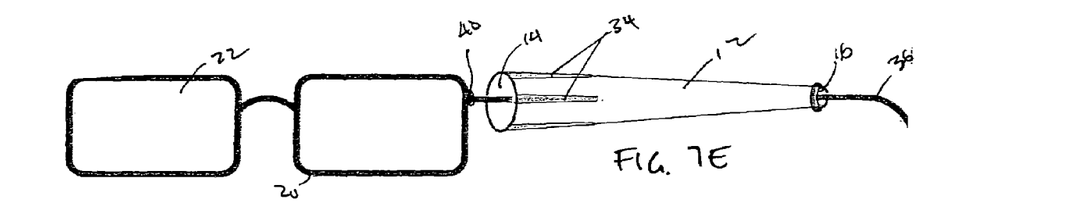
Figure 7F:
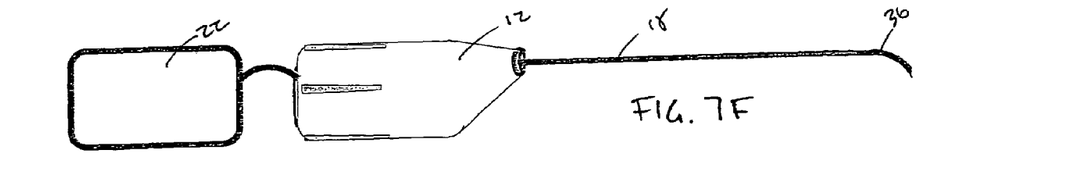

When the user wishes to use the tubular members 12 to cover the lenses 22, she must first untwist the ends of the tubular members 12 such that the tubular members 12 are no longer twisted around the temples 18 (as shown in FIG. 7D). She must then slide the sliding retaining member 32 towards the back opening 16 of the tubular member 12 (as shown in FIG. 7E). Finally the user may then pull the tubular member 12 around the lens 22 (as shown in FIG. 7F). It should be appreciated that as the front opening 14 stretches to accommodate the lens 22, the strips 34 will separate. However, they do not interfere with the operation of the protective cover 10.

Illustrated in FIGS. 8–10B is yet another alternative embodiment in which the pair of tubular members 10 are formed as part of a single strap-like device 42. In the preferred implementation of this embodiment, the strap-like device 42 is composed of a single tube 44, preferably of fabric, approximately one to three feet in length, and may be elastic. Each end of the tube 44 operates as a separate tubular member 12 than can be fitted over the temples 18 of a pair of eyeglasses 20. As in the previous embodiments, each tubular member 12 must have sufficient elasticity to stretch to completely cover the lenses 22 of the eyeglasses 20 and contract enough to fit snugly around the temples 18. Alternatively, fabrics with less elasticity may be used in connection with additional features, such as shirred fabrics, snaps, elastic bands, pull cords, clips, or hook and loop fasteners in combination with elastic tabs, etc.

In this embodiment, the middle portion 46 of the fabric tube 44 can be placed around the wearer's neck or head, whether or not the glasses 20 are being worn, in order to act as a retainer.

Figure 8:
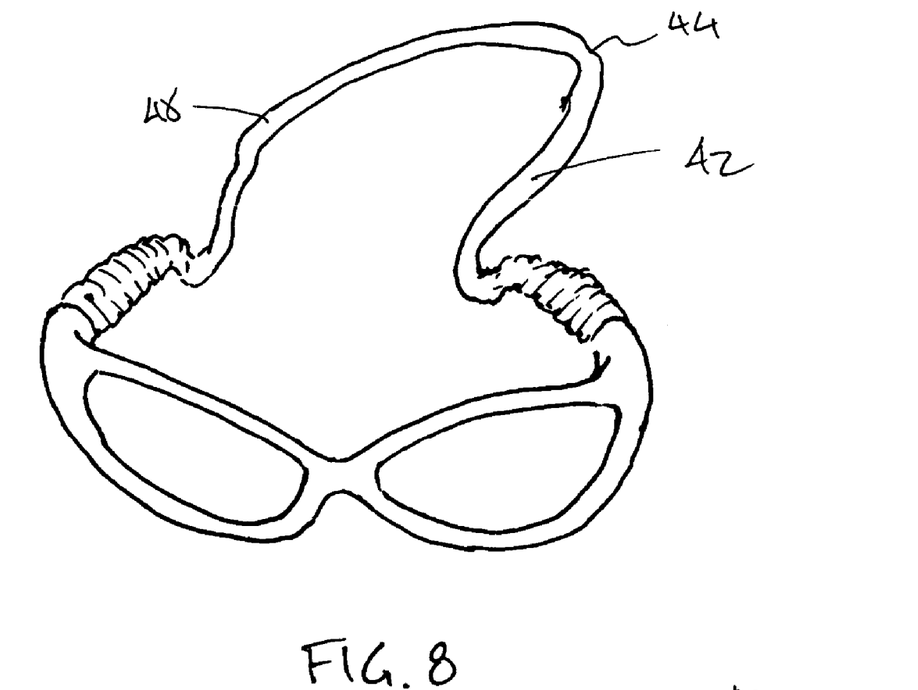
FIG. 8 is a perspective view of another alternative embodiment of the protective cover of the present invention wherein the pair of tubular members are formed as part of a single strap-like device.
Figure 9:
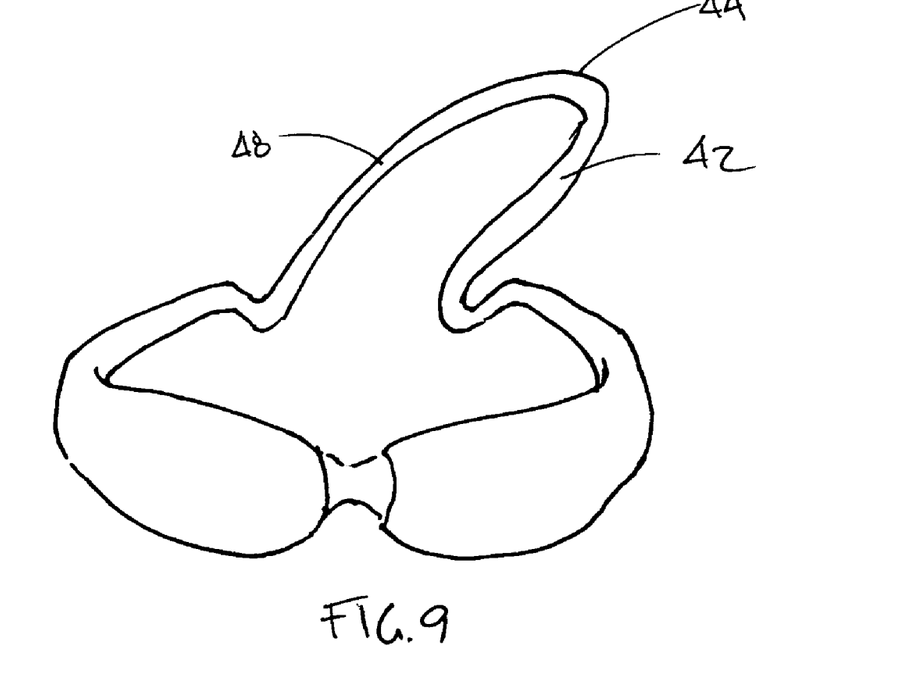
FIG. 9 is a perspective view of the embodiment of FIG. 8 showing the tubular members covering the eyeglasses.

FIGS. 8 and 9 illustrate the instant embodiment in the "off" and "on" positions, respectively. In the "off" position, which is used when the user wants to wear the eyeglasses 20 and as illustrated in FIG. 8, the tubular members 12 attached to each temple 18 are slid off the lens 22 and secured to the temples 18, to thereby act as a means to attach the retainer 10 to the eyeglasses 20. In the "on" position, which is used when the user wants to take off his or her eyeglasses 20 and which is illustrated in FIG. 9, the glasses 20 are hung around the user's neck and the tubular members 12 are slid over the lenses 22 to protect them.

Figure 10A:
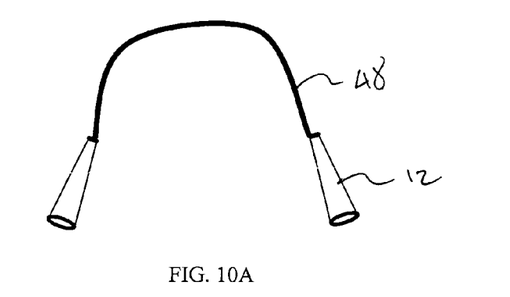
FIG. 10A is a top plan view of one embodiment of the alternative embodiment of FIG. 8 wherein two tubular members are attached to a single cord or strap.

Other means for connecting the pair of tubular members 12 are also contemplated. For example, a cord or strap 48 may be attached to the pair of tubular members 12, as illustrated in FIG. 10A. The means of attachment may be permanent, such as by sewing or using adhesives or even knitting the device out of one piece of fabric, or detachable, such as by attaching strap or cord 48 using elastic rings, snaps, elastic bands, pull cords, clips, or hook and loop fasteners in combination with elastic tabs, for example.

Figure 10B:
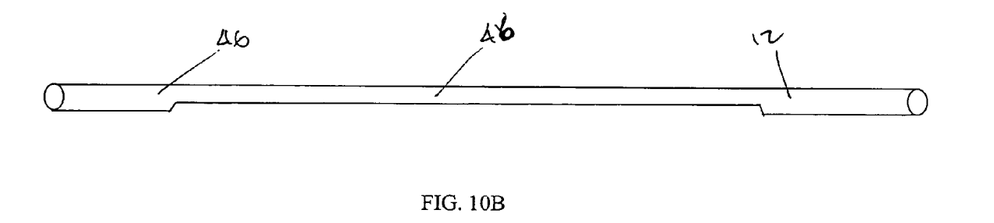
FIG. 10B is a top plan view of another embodiment of the alternative embodiment of FIG. 8 wherein the two tubular members are formed from a single tube and wherein the middle portion of said single tube is cut or removed so as to appear as a cord or strap.

An example of a permanent means of attachment is illustrated in FIG. 10B, wherein the entire device 10 is manufactured from a single tube 44 of fabric. In this illustration, the middle portion 46 may be cut and/or sewn and/or adhered such that it does not appear as a simple tube but rather as a flat strap.

Having thus described the invention with particular reference to the preferred forms thereof, it will be obvious that various changes and modifications can be made therein without departing from the spirit and scope of the present invention as defined by the appended claims.

I claim:

1. A protective cover for eyeglasses having frames and including lenses and opposing temples, said protective cover comprising a pair of tubular members adapted to alternatively slide over said temples and said lenses to cover and prevent damage to said lenses and slide off said lenses to cover only said temples when said eyeglasses are being worn, wherein said tubular members are attached to each other by a strap.

2. The protective cover of claim 1, wherein said tubular members are elastic.

3. The protective cover of claim 1, wherein said strap is composed of fabric.

4. The protective cover of claim 1, wherein said tubular members and said strap are all formed out of elastic fabric.

5. The protective cover of claim 1, wherein said tubular members include an opening at either end thereof, said opening being adapted to stretch to receive said temple and to stretch around said lens, and wherein said tubular members are permanently attached to said strap.

6. The protective cover of claim 1, wherein said tubular members include an opening at either end thereof, said opening being adapted to stretch to receive said temple and to stretch around said lens, and wherein said tubular members are removably attached to said strap.

7. The protective element of claim 1, wherein said strap is between one and three feet in length.

8. The protective cover of claim 1, said tubular members and said strap are formed out of a single tube of elastic fabric having a diameter sufficient to allow said tubular members to stretch around said lenses while allowing said tubular members to engage said temples.

9. The protective cover of claim 8, wherein said strap includes a middle portion and two end portions, and wherein said middle portion is sewn so as to appear flat.

10. The protective cover of claim 8, wherein said strap includes a middle portion and two end portions, and wherein said middle portion is flattened using an adhesive.

11. A protective cover for eyeglasses having frames and including lenses and opposing temples, said protective cover comprising a pair of tubular members adapted to alternatively slide over said temples and said lenses to cover and prevent damage to said lenses and slide off said lenses to cover only said temples when said eyeglasses are being worn, wherein said tubular members are attached to each other by an elongated strap, and further wherein said tubular members and said strap are formed out of a single tube of elastic fabric having a diameter sufficient to allow said tubular members to stretch around said lenses while allowing said tubular members to engage said temples.

12. A method for protecting the lenses of a pair of eyeglasses also having a pair of temples, said method comprising the steps of:
    providing a protective cover for said eyeglasses comprising a pair of tubular members adapted to alternatively slide over said temples and said lenses to cover and prevent damage to said lenses and slide off said lenses to cover only said temples when said eyeglasses are being worn, wherein said tubular members are attached to each other by an elongated strap;
    sliding each of said temples through said tubular members;
    sliding and stretching said tubular members over and around said lenses so as to completely cover said lenses when protection of said lenses is desired; and
    sliding and stretching said tubular members off of said lenses while remaining on said temple.

* * * * *